(12) United States Patent
Bitsch et al.

(10) Patent No.: US 7,783,637 B2
(45) Date of Patent: Aug. 24, 2010

(54) LABEL SYSTEM-TRANSLATION OF TEXT AND MULTI-LANGUAGE SUPPORT AT RUNTIME AND DESIGN

(75) Inventors: René Bitsch, Helsinge (DK); Jakob Steen Hansen, Kokkedal (DK)

(73) Assignee: Microsoft Corporation, Redmond, WA (US)

(*) Notice: Subject to any disclaimer, the term of this patent is extended or adjusted under 35 U.S.C. 154(b) by 1894 days.

(21) Appl. No.: 10/674,834

(22) Filed: Sep. 30, 2003

(65) Prior Publication Data

US 2005/0071324 A1 Mar. 31, 2005

(51) Int. Cl.
G06F 7/00 (2006.01)
G06F 15/00 (2006.01)

(52) U.S. Cl. ........................ 707/736; 707/758; 707/770; 715/522; 715/530; 717/127; 717/136; 717/163

(58) Field of Classification Search ................ 707/3, 707/4, 6, 10, 736, 758, 770; 717/127, 136, 717/163; 715/522, 530
See application file for complete search history.

(56) References Cited

U.S. PATENT DOCUMENTS

| | | | |
|---|---|---|---|
| 5,802,534 A * | 9/1998 | Hatayama et al. | 715/530 |
| 5,842,217 A | 11/1998 | Light | |
| 5,995,979 A | 11/1999 | Cochran | 707/104.1 |
| 6,006,225 A | 12/1999 | Bowman et al. | |
| 6,011,847 A | 1/2000 | Follendore, III | 713/160 |
| 6,425,123 B1 | 7/2002 | Rojas et al. | 717/136 |
| 6,467,082 B1 | 10/2002 | D'Arcy et al. | 717/127 |
| 6,493,661 B1 | 12/2002 | White, III et al. | 704/8 |
| 6,507,812 B1 | 1/2003 | Meade et al. | 704/8 |
| 6,629,104 B1 * | 9/2003 | Parulski et al. | 707/102 |
| 6,678,866 B1 * | 1/2004 | Sugimoto et al. | 715/517 |
| 6,772,110 B2 | 8/2004 | Real et al. | 704/8 |

(Continued)

FOREIGN PATENT DOCUMENTS

WO    WO 94/19755    9/1994

OTHER PUBLICATIONS

"Message Database" IBM Technical Disclosure Bulletin, IBM Corp. New York, US, vol. 36, No. 7, Jul. 1, 1993, pp. 397-398.

(Continued)

*Primary Examiner*—John E Breene
*Assistant Examiner*—Anh Ly
(74) *Attorney, Agent, or Firm*—Westman, Champlin & Kelly, P.A.

(57) ABSTRACT

A method stores and uses labels in a business solution software program having multiple languages. Instead of having a single resource file for each language, the information related to the labels is stored in a database. Each label is assigned its own unique identifier in a label ID structure, that also contains information related to how the label is used in the system. The text for the label is stored in a separate label text structure. The label text structure contains the text of the label in all of the available languages. When a new label is written the developer can search the current labels to find a label that matches the intended use. If a match is found for the desired text the label is duplicated to the new label. If no match is found a new label must be generated.

17 Claims, 7 Drawing Sheets

U.S. PATENT DOCUMENTS

| | | | |
|---|---|---|---|
| 6,804,684 B2 * | 10/2004 | Stubler et al. | 707/102 |
| 2001/0002469 A1 | 5/2001 | Bates et al. | 707/1 |
| 2002/0123878 A1 | 9/2002 | Menke | |
| 2002/0156770 A1 | 10/2002 | Krischilsky et al. | |
| 2002/0193986 A1 | 12/2002 | Schirris | |
| 2003/0004946 A1 | 1/2003 | VanDenAvond et al. | 707/9 |
| 2003/0046639 A1 | 3/2003 | Fai et al. | 715/513 |
| 2003/0094494 A1 | 5/2003 | Blanford et al. | 235/462.07 |
| 2003/0101046 A1 | 5/2003 | Krasnov | |
| 2003/0115552 A1 | 6/2003 | Jahnke et al. | 715/536 |
| 2003/0125972 A1 | 7/2003 | Luce et al. | 705/1 |
| 2003/0140098 A1 * | 7/2003 | Brennan et al. | 709/203 |
| 2003/0167209 A1 | 9/2003 | Hsieh | 705/26 |
| 2003/0220912 A1 | 11/2003 | Fain et al. | 707/3 |
| 2004/0039989 A1 | 2/2004 | Warren | 715/505 |
| 2004/0056894 A1 * | 3/2004 | Zaika et al. | 345/762 |
| 2004/0128272 A1 | 7/2004 | Salomon et al. | 707/1 |
| 2004/0230328 A1 | 11/2004 | Armstrong et al. | |
| 2004/0243572 A1 | 12/2004 | Muto | |
| 2004/0254928 A1 | 12/2004 | Vronay et al. | 707/5 |
| 2004/0260689 A1 | 12/2004 | Colace et al. | 707/3 |
| 2005/0021533 A1 * | 1/2005 | Ayachitula et al. | 707/100 |
| 2005/0038558 A1 | 2/2005 | Keene | 700/235 |
| 2005/0071324 A1 | 3/2005 | Bitsch et al. | 707/3 |
| 2005/0267787 A1 | 12/2005 | Rose et al. | |
| 2006/0074987 A1 | 4/2006 | Bitsch | 707/104.1 |
| 2006/0146790 A1 | 7/2006 | Caballero-McCann et al. | 370/352 |
| 2006/0224995 A1 | 10/2006 | Treibach-Heck et al. | |

OTHER PUBLICATIONS

"A multi-tiered classification scheme for component retrieval" Euromico Conference, 1998.Smith E. et al., Aug. 25, 1998, pp. 882-889.

"The integration and Adaptation of Reusable Components Through Semantic Interface Analysis", William C. Chu, Computer Software and Applications Conference 1994, Nov. 9, 1994, pp. 252-257.

Chinese Patent Application No. 200410104786.8 First Office Action dated Nov. 9, 2007.

Chinese Patent Application No. 200410104786.8 Second Office Action dated May 9, 2008.

European Patent Application No. 04018143.0 Examination Report dated Aug. 4, 2008.

International Search Report and Written Opinion dated Dec. 13, 2005 for Int'l Appln. No. PCT/US04/23555, filed Jul. 22, 2004.

Office Action dated Jan. 24, 2006 for related U.S. Appl. No. 10/696933. filed Oct. 30, 2003.

Office Action dated Aug. 22, 2006 for related U.S. Appl. No. 10/696933. filed Oct. 30, 2003.

Office Action dated Jan. 26, 2007 for related U.S. Appl. No. 10/696933. filed Oct. 30, 2003.

Office Action dated Aug. 6, 2007 for related U.S. Appl. No. 10/696933. filed Oct. 30, 2003.

Office Communication dated Jan. 26, 2010 for related U.S. Appl. No. 10/696933. filed Oct. 30, 2003.

Third Chinese Official Action dated Mar. 1, 2010 for Appln. Serial No. 200480001670.X.

* cited by examiner

LABEL ID 230

| | 231 | 232 | 234 | 235 | 236 |
|---|---|---|---|---|---|
| | GUID | NAMESPACE | CATEGORY | DESCRIPTION | DUPLICATED FROM |
| 301 | 1 | | | | |
| 302 | 2 | BILLING MODULE | | | |
| 303 | 3 | | MENU BAR | USED IN CASE OF A LEDGER | 1 |

FIG. 3A

LABEL TEXT 240

| LABEL ID 244 | TEXT ID 245 | TEXT 241 | EDITED DATE 242 | LANGUAGE 243 |
|---|---|---|---|---|
| 1 | 351 | DO YOU WANT TO SAVE THE CHANGES YOU MADE TO | 22-AUG-2003 | ENGLISH - UNITED STATES |
| 1 | 352 | MÖCHTEN SIE DIE ANDERWUNGEN GEBILDET AN SPEICHEIN | 27-AUG-2003 | GERMAN - DEUTCH |
| 1 | 353 | LAVE JER VILLE GERNE OPSPARE DEN FORANDIGERJER INDRETTET TIL AT | 27-AUG-2003 | DANISH - DANSK |
| 1 | 354 | VOUS VOULEZ EN SAUVER LES CHANGEMENT VOUS FAIT Á | 27-AUG-2003 | FRENCH - FRANCAIS |

FIG. 3B

LABEL SYSTEM-TRANSLATION OF TEXT AND MULTI-LANGUAGE SUPPORT AT RUNTIME AND DESIGN

BACKGROUND OF THE INVENTION

The present invention relates to merging and developing labels in a business solution software program. In particular, the present invention relates to a label database and a label dialog used in developing and merging labels in modules for the business solution software.

Business solution software programs provide an end user, typically a corporation, with a customizable, scalable and global enterprise resource planning solution that supports connectivity with the user's various business partners. Many business solution software programs provide the ability to expand the basic functionality of the software beyond the original product to further meet the needs of the implementing corporation. This new or additional functionality is provided through additional modules that are written to take advantage of the existing features and existing data contained within the business solution software. Often these additional modules automatically synchronize the software and the existing data with both the old and new functionalities of the business solution software.

Some business solution software provides the ability to conduct business in different countries, across multiple languages and in multiple currencies. Through the use of multi-language capabilities provided in business solution software it is possible to transmit documents, such as invoices, in the recipients preferred language. However, changing the language of the documents in current systems requires loading the new language into the business solution software, and changing the entire operating language of the system.

Communication in different available languages of the business solution software is handled through the use of a plurality of labels. Labels are text that appear on a user interface component, or in a printed document. Labels can be used on menus, buttons, dialog boxes, etc. Further, labels can be used on controls that has label properties such as "label", "help", "caption" and "tool tip". The labels in current business solution software are stored in separate resource files with one resource file dedicated to each language used by the business solution software. Further, each module in the business solution software has its own resource file that is not shared with other modules, or the business solution software itself.

Throughout the development of business solution software there has been a strong desire among developers to reuse existing labels. However, it has been observed that it is not as advantageous to reuse existing labels, because various properties associated with a term of the label can change between different uses, or the meaning of a label can vary between different developers. This can create problems when a term is changed. For example, a label text can be used in a menu on one application and a button on another, thus resulting in different properties for each label. What most developers desired was to reuse the terms or text that comprise the labels so as to reduce the costs associated with developing labels for various modules on the system.

As mentioned above, typically, in business solution software modules the labels are kept in resource files. However, current business solution software does not use the generic resource files that are available through database metadata stores, such as structured query language (SQL) tables or through web services. Typically these labels, in the business solution software, are module specific, and are stored in proprietary resource files with one resource file dedicated to each language present in the module. One problem associated with using proprietary resource files is that when a developer desires to replace or edit a portion of the labels in one module with new information or properties contained in another resource file the development system does not look for another label in other modules of the business solution software having the same label properties and/or terminology as the desired label. Further, using resource files makes the management of labels extremely difficult due to the large number of labels present in the software solution. However, in a business solutions environment the business solution software is required to handle a number of different solutions that are developed by multiple vendors. Often times the developers of these modules are developing labels that overlap with labels developed for other modules in the business solution software. The costs associated with developing labels, and translating (when multi-language support is desired) the labels is expensive and time consuming, especially when the label and its translations already exist elsewhere in the business solution software. Therefore, it is desirable to have a label system that uses the combined contributions of the various module vendors, as opposed to a completely proprietary system that requires each vendor to develop its own labels for each desired label. Further, it is desirable for a system that makes it possible to search existing label texts and provides the ability to reuse the text while still handling that the context in which the label is used might differ from the use of the label when it was originally created.

SUMMARY OF THE INVENTION

The present invention addresses the needs of developers of modules in business solution systems. Unlike in previous systems, the labels (i.e. display text) are kept in a common resource file, where each module of the system accesses the same resource file instead of a proprietary resource file for each module. Further enhancing the efficiency of the present invention, all language texts are stored in the same resource file or database as the original language. Each label used by a module is identified in a label table by a unique identifier, such as a Globally Unique Identifier (GUID), a description of its use, and an associated category and namespace. This information assists the developer in determining if an existing label in the database is useful when creating a new label or a new module.

Each label also has a set of entries in a label text table database, that represents versions of the label text in a plurality of languages as well as other information useful in managing the label's text. The original language of the label text is identified as a master language. When the user desires to change the language of the business software solution system, change the language of a module, or print a document in another language, the label text table allows access to the available languages without having to load a new language set into the system and replacing the preferred language of the system with the temporary language. This allows for rapidly changing the language without confusing the user by requiring the entire system to function in the new language. Further, the system will always try to display the current active language. If the current active language is missing for the label a fall back language can be used.

One embodiment of the invention also addresses a situation in which a developer is developing a new module or editing an existing module for the business solution software. The present invention allows the developer to identify an existing label through a label dialog development tool. First, the developer opens a user interface in a development display. This display displays to the developer a search function that allows a search through the label text database and access to all of the available labels. The developer then enters into the search engine the text of the label desired. This text can be entered in its totality or as a portion of the desired label using regular expressions. In alternate embodiments, the developer can indicate the desired use of the present text label, the language of the text label, or other information that helps to identify the use of the desired label.

Based on the entered data, the search engine searches the label text database, and identifies those label texts that most closely match the desired text, as well as any provided namespace and category. The identified texts are returned to the developer in the search engine display and can be displayed in a data grid. The results are ranked according to a predetermined method, such as label texts having the category and language most closely matching the desired text are displayed first, and those not having the same category are displayed last. Then the developer can find a result in the returned results containing the desired text. If one of the results contains the desired text for the new label, the developer can select the desired label from the results.

Upon selecting the results, the developer is presented with more information about the specific label contained in the database. If the use of the selected label text is the same as the new label, then the developer can use the selected label for the desired target label. However, if the use of the selected label is not the same as the new label the developer can duplicate the label to the new label.

When the selected label is duplicated to the new label, a GUID is generated for the new label, and an entry in the new label's record is generated indicating the GUID of the label that was duplicated to this label. This entry is provided to allow the text of the new label to be updated when the parent label's text is changed. Further, when a label is duplicated to the new label any associated translations are copied to the label text table for the new label. This allows for the full language capability of the business solution software system to carry over to the new label without incurring any additional costs associated with translating the new label into the available languages. In another embodiment, when a translated version of the label is updated, all related labels sharing the same master label are updated with the new version of the translated label.

When the selected label is duplicated to the new label, the textual information of the label is copied over to the new label, as well as all other information except the label ID of the master label. If the desired text for the label is not found then the developer must create a new label for the desired label. Further, the developer will have to generate new translations for the label text for the new label. In other words, if the developer finds a label in the system then the label is duplicated. However, if the developer changes information on the label then the label will appear as a new label for the system.

BRIEF DESCRIPTION OF THE DRAWINGS

FIGS. 3A and 3B are diagrammatic illustrations of the fields in the label ID table and the label text table.

DETAILED DESCRIPTION OF ILLUSTRATIVE EMBODIMENTS

Figure 1:
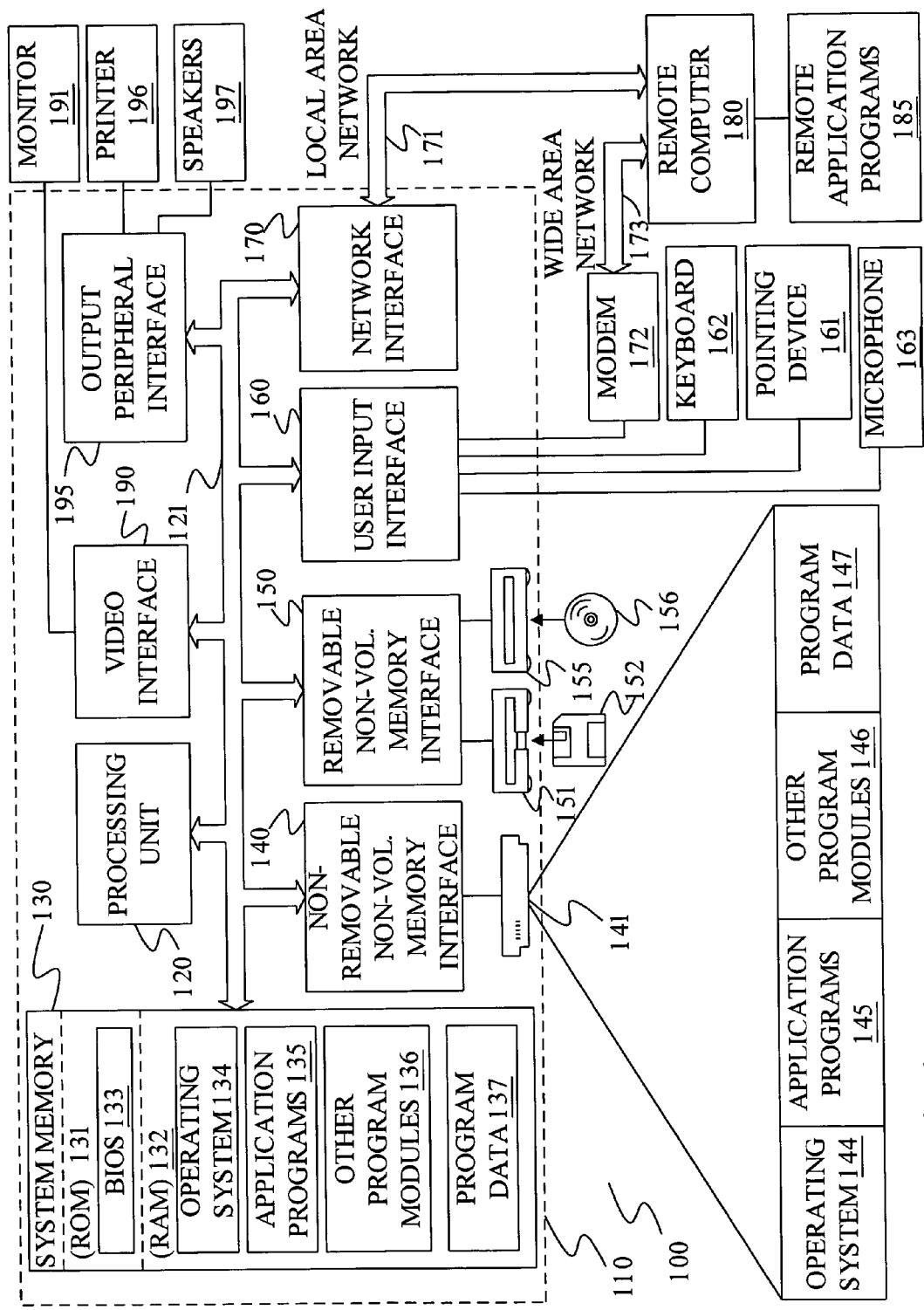
FIG. 1 is a block diagram of one exemplary environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

In one embodiment, system 100 includes software for generating a business management solution that can integrate general accounting and business functions with specific application modules. These modules can include modules for finance, trade, logistics, production, customer service, projects and human resources. However, other module types can be used in the business management solution. The solution of the present invention can be configured to support multiple currencies (Euros, Dollars, Yen, Wan, etc), multiple languages (English, German, French, Danish, Russian, Japanese, Chinese, etc) and multiple tax formats (for use by end users who deal with multiple taxing authorities).

The modules used in the business management solution can be developed from a variety of different sources. In one embodiment, a common link between all of these modules is the use of labels. Labels are text represented by an identifier. Labels can be used on any object having a label property including dialog boxes, text strings, or any text used to convey information to the user. Labels are commonly presented to the user through a resource such as a graphical user interface, or GUI. However, the label can be presented to the user though any other means that presents text to the user. Further, labels can be used on controls that have label properties such as "label", "help", "caption" and "tool tip". In previous business solutions software the labels for each module are kept in separate resource files. However, these resource files were commonly kept in a flat file architecture that was proprietary to the specific module. Often during the development process of the modules, the developer knows of a label in another module that meets the requirements of a currently being created label. However, the proprietary file source structure of the prior art systems prevents the developer from using labels from one module in another module, nor was it possible to search for labels.

Figure 2:
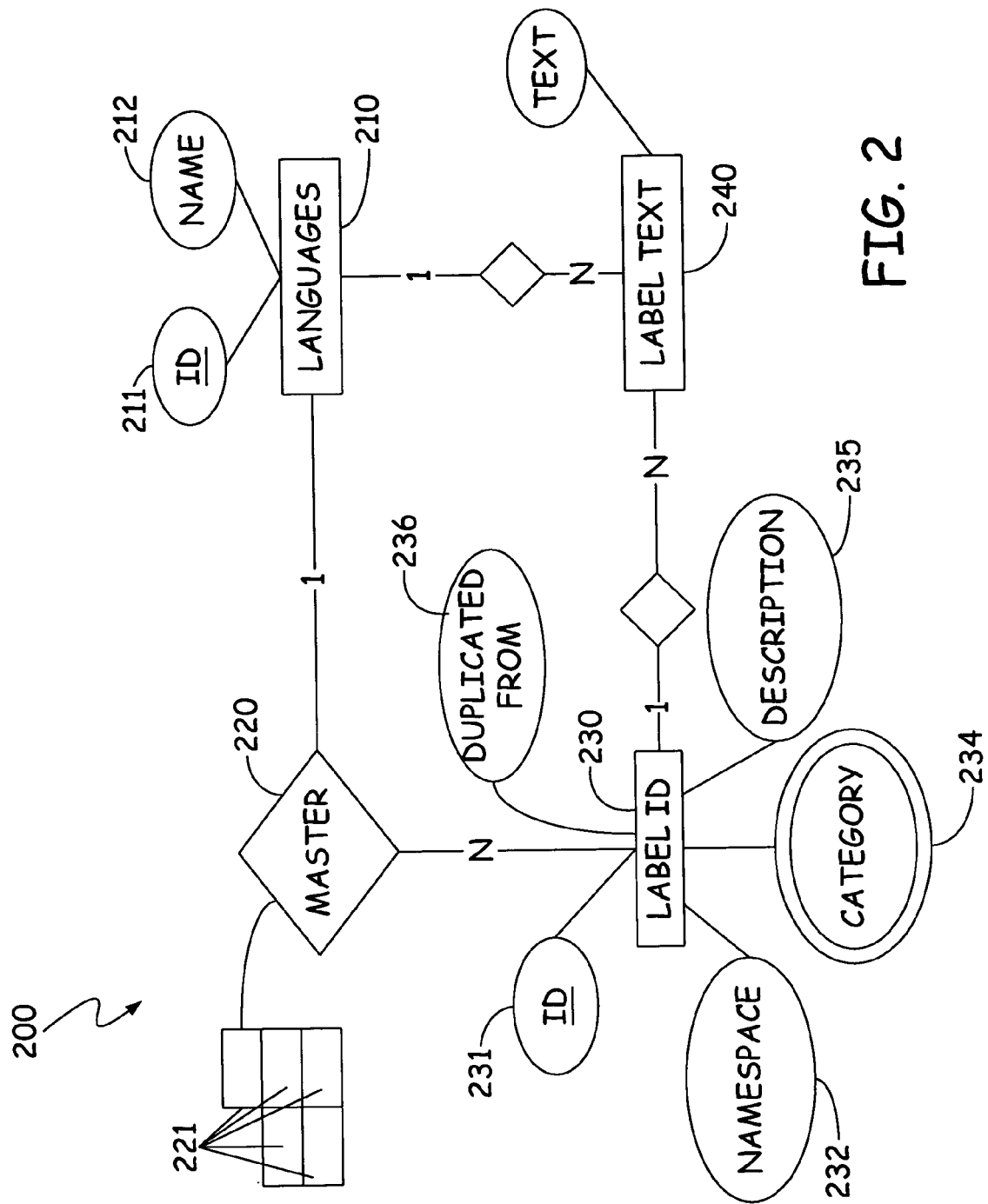
FIG. 2 is a block diagram illustrating the tables that comprise the label system of the present invention.

FIG. 2 is an entity relation diagram illustrating the relationship between various collections that comprise a label in business solution system 200, according to one embodiment of the invention. The entity relation diagram of FIG. 2 includes a language table 210 (or other indication of available languages in the system), a master 220, a label ID table 230, and a label text table 240. In one embodiment these collections are organized as structured query language (SQL) metadata stores arranged into tables. However, other arrangements and other databases for the collections can be used. The label ID table 230 and the label text table 240 are described in greater detail with reference to FIGS. 3A & 3B.

The language table 210 is a table that includes at least two sub-fields. The two sub-fields in the language table 210 are a language ID field 211 and a language name field 212. The language ID field 211 holds a code that indicates a specific language, and is understandable by the business solution software program. The language name field 212 is a text field that holds the name of the language. For example, if one of the available languages is English-United States then the language ID field 211 illustratively could be "01", or it could be "en-us", if using ASCII standards. However, other ID types can be used in the language ID field 211. The language name field 212 of the metadata table for this entry would be "English-US", for example. Alternatively, this entry could be a label with the specific language text if this solution was provided by the specific solution.

The information stored in the language table 210 can be displayed to the user in a label dialogue display when the user desires to view or change the operating language of the system. The language table 210 is in a 1:n relationship with the label text table 240. This relationship (1:n) occurs because there can be a plurality of label texts representing different labels in each language available to the system 200.

The master 220 is in one embodiment a table including one version of each label in system 200. In one embodiment, the master 220 holds the original version of the label in the original language and format. However, other versions of the label can be stored in the master 220. For example, if best practices guidelines are used then the system 200 can store in the master 220 the label in English-United States. The best practices guidelines are a set of procedures that standardize label development with specific category types, descriptions, and languages. Each label in the system 200 has an associated entry in the master 220. The master label is used when a label's translation is being updated, the label has not been translated into the currently selected (active) language, or for any reason becomes inaccessible to the system 200. However, in alternative embodiments, information that is stored in the master 220 can be stored as a field or fields in either the label table 230 or the language 240 indicating the label ID of the master label. Further, the master 220 can be a simple field keeping information about which language label was created. This field can be located in any of the tables in system 200.

Each master table entry 221 corresponds to one entry in the label ID table 230. The label ID table 230 includes various properties that assist a translator (who is translating the text) in translating the label correctly. These properties also assist the developer in using the label properly. The relationship between a master table entry 221 and the label ID table 230 is 1:n, as multiple label IDs can share the same master label.

The label text table 240 includes entries containing the text for each label identified by a label ID. The label text table 240 also includes entries containing translations for each label ID in various languages. The relationship between the label ID table 230 and the label text table 240, as well as the relationship between the language table 210 and the label text table 230 is 1:n. This is because there is one entry in the label ID table 230 for a label, but the text of a label can exist in multiple languages. However, in other embodiments of the present invention the relationship between the label ID and label text can be 1:1 (or 1:0 if no text is present), where each translation of the master label has its own unique label ID and entry in label ID table 230.

FIG. 3A illustrates the fields that comprise the label ID table 230 according to one embodiment of the present invention. Label ID table 230 includes an ID field 231, a namespace field 232, a category field 234, and a description field 235. In other embodiments the label ID table 230 can include a field 236 indicating whether the entry in the label ID table is duplicated from another label, or has been duplicated to another entry in the table.

Typically, labels are kept in resource files. Present business solution systems do not use generic resource files that are available through database metadata stores such as SQL tables. In present business solution systems these labels are stored in proprietary resource files. One problem associated with using proprietary resource files is that when the developer desires to replace a portion of the label or labels in the system with a file having all of the resources for the file, the system does not look for another file in the system that has the same label properties or terminology as the current label. However, in a business solutions environment, the business solution system is required to handle a number of different solutions to the same or similar problems that are developed by multiple vendors. Therefore, the label system 200 of the present invention can use the sum of all of the contributions made by the various vendors.

The ID 231 field is used to identify a specific label in the system 200. In one embodiment this ID is a global unique identifier or GUID. A GUID is used to avoid problems occurring because two vendors have chosen the same identification number for two unrelated labels. A GUID in one embodiment, is a 128 bit integer (16 bytes) that can be used across all computers and networks wherever a unique identifier is required. Use of such an identifier system reduces the chances that two labels will have the same ID. A GUID is represented, in one embodiment, as a string and is formatted according to the following pattern:

xxxxxxxx-xxxx-xxxx-xxxx-xxxxxxxxxxxx where the values of the GUID is represented as a series of lower-case hexadecimal digits in groups of 8, 4, 4, 4, and 12 digits and are separated by hyphens. For example the GUID return value for the entry of line 301 can be 382c74c3-721d-4f34-80e5-57657b6cbc27. However, other formats types can be used for the ID field 231. Each time a new label is generated it is assigned a new GUID. In one embodiment a new label is defined as a label that is new to the system 200, and not merely a translation of an existing label. However, in other embodiments, a new entry in the ID field 231 is generated for the translations of existing labels.

The use of a GUID provides added benefits over current systems. First, there is no need to divide each label into a plurality of languages. Further, GUIDs allow for each label to be uniquely identified without the need to control the uniqueness in other ways such as through the use of row numbers. Second, GUIDs allow the physical storage of labels to be changed from proprietary resource files to common resource files such as a metadata database, on a web service.

The namespace field 232 in label ID table 230 is a special field entered into the label ID to assist translators in obtaining the correct terms for the label when translating the label text from the master language to the target language. In current label systems it is not possible to see easily where in the program a specific label is used. Further, it is not easy to see in which areas the label is used. Therefore, it is extremely difficult, if not impossible, for a translator to obtain the correct term for the label, unless the program is installed on their computer, and they are able to see where the label is used. The namespace field 232 makes it possible to see the area the label is used without having to have the program installed on the translator's machine. The information contained in the namespace field is provided by the developer when a new label is created (either automatically or manually), and provides information related to the use of the specific label. For example, in the entry of line 302 of FIG. 3A, the name space field 232 tells the translator or developer that this label is used in a billing module.

The category field 234 in the Label ID table 230 is a special field that illustrates in which component of the program the label is used. Further, the use of the category field 234 assists a developer while creating a label text to write the label in the correct manner. The category is a combination of a node type and a property for the label. Node types are the specific properties of the label. Some of these labels properties can include "label", "help", "caption", etc. Thus, the category field 234 makes it possible to ensure that a label is used in a proper way for the desired program. Further, categories are a mapping of all of the controls present in the system. Therefore, it is possible to search the existing database of labels based on the type or category of label desired. In the present invention a category is created for each rule or control that is performed by the system 200. During the development of a module additional categories can be created if a special rule is needed for a specific label text. For example, the node field 234 can be an entry telling that the label at entry 303 is used on a menu bar of the module to direct the user to another point in the module. Each category is mapped to a specific function in the system 200.

The description field 235 is an entry in table 230 that describes to the user or developer how the label is used. For example, the description field 235 can be an entry telling that the label at entry 303 is used on a case of a ledger. This description can be in words (plain text) or it can be coded against a predetermined list of codes.

The duplicated from field 236 indicates whether the associated label of the entry has been duplicated from another label in the label system. If the label has been duplicated from another label, the duplicated from field 236 includes the ID from the parent or master label 220. In one embodiment this ID is the GUID of the parent. However, other ID's can be used in field 236. If the label is not a duplicated version of another label then the duplicated from field 236 is blank or set to null. Further, if the text of the label is changed from the master label's text after copying then the duplicated from field 236 is set to null, thereby eliminating any link between the master label 220 and this particular child label. However, other changes to the entry will result in the duplicated from field 236 being reset. In an alternative embodiment, the label ID table 230, of FIG. 3A includes fields that indicate what label ID's contain duplicated labels. A label in ID table 230 is either a master label or a child.

FIG. 3B illustrates the fields that populate the label text table 240 of a specific label. The label text table 240 entry includes at least three different fields: a label ID field 244, a label text field 241 and an edited date 242. In alternative embodiments of the present invention additional fields can be added to the label text table 240. These fields include a field 243 indicating the language the text is written in, or a field identifying the entry identifier of each version of the text in the label text table.

The text field 241 of the label text table 240 includes the most recent versions of the text for the label in all available languages for the system. The first entry 351 in the label text table 240 for the label is in the original or master language the label was written. This text is referred to as the master text. If the label is developed according to the best practices guidelines, the master text will be written in English-United States. However, other languages can be used as the master language, and the best practices guidelines need not be followed. Generally, the master language will correspond to the current language the system is operating in.

As the label text is translated from the master language to another language, a new label text entry is made in the label text table e.g. 322 and 323. These entries contain translated versions of the original label text in their respective languages. For example, if the original text of the label is "Do you want to save the changes you made to", this text is stored in the first line 321 of the label text table 240. Later, when the text is translated into German, Danish and French, the translations are entered into the label text table in the entries below the master text entry. These added translations are indicated by entries 352, 353, and 354.

The edited date field 242 is provided in the label text table 240 so that developers know when the text of the label was last changed in the language associated with that particular entry in the label text table. Further, other fields containing validation information can be added, such as a "modified by" field. This date helps to ensure that if a translation for a text is provided, it does not replace an already more current version of the translation. When translations are automatically loaded into the system the translation dates are compared and if the version in the entry is more current than the proposed entry, the proposed entry is not entered into the table. Also the edited date field 242 allows the developer to check if the translations are current with the most recent version of the master text entry. In one embodiment, the master text entry's 321 edited date is desirably the oldest date in the label text table 240 for a particular label.

In some embodiments the label text table 240 includes a language field entry 243. The language field entry 243 indicates to the developer the specific language of a particular entry in the label text table, even if the developer does not speak or understand the language. This language indicator in the language field entry 243 can be a numerical representation of the language or it can be written as the name of the language, or any other kind of language identifier.

If a numerical representation is used to identify the language, the reference number or entry for the language may illustratively conform to a known standard, such as ASCII language codes or ISO 639. However, other codes can be used to identify the language of the text entry. If the name of the language is entered in the field 243, then the name of the language may illustratively be written according to a known standard (i.e. language names in English). However, other formats can be used.

The label text table 240 also includes an entry field 244 identifying the label ID 231 for the particular label text. This entry allows the developer to know to which label ID 231 the present text is related. Further embodiments of the label text table 240 include entries for a text ID 245. This text ID 245 is provided to individually identify each text label as its own entry in the label text table 240. The text ID 245 entry can be GUID, or it can be any other identification method consistent with the configuration of the label text table. In an alternative embodiment label text table 240 and label ID table 230 can be merged into one table or database. In this embodiment an additional set of fields would be needed to manage the labels and to insure the correct label language text is displayed when the module is run. Further, an index would be added to manage the loading of the labels.

Figure 4:
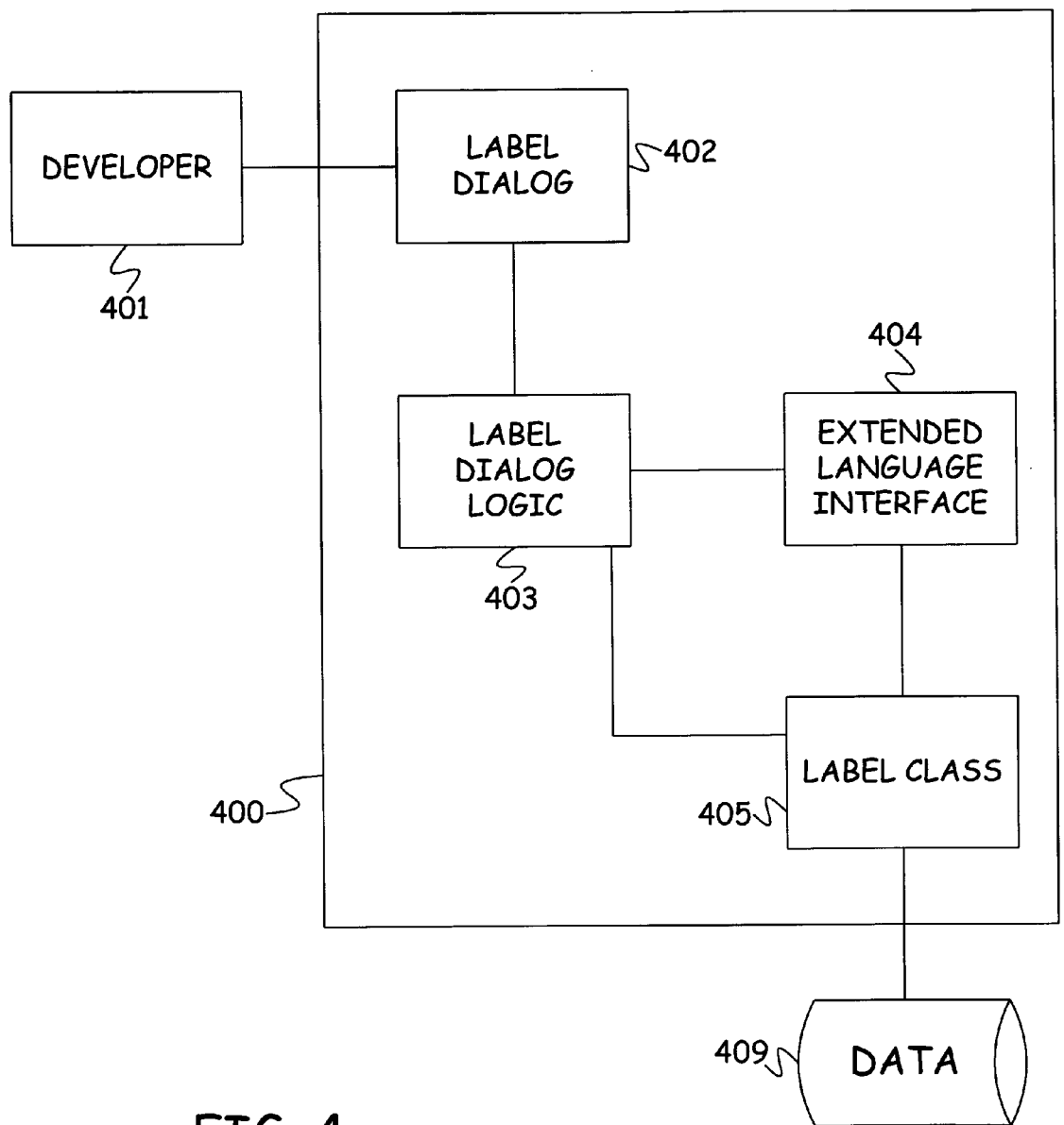
FIG. 4 is a block diagram illustrating the relationship between the components of the label dialog.

FIG. 4 is a block diagram illustrating the components that comprise the label system interface 400. The label system interface 400 is an interface that links the developer 401 to the metadata store 409, and allows the developer to manipulate existing labels when developing new modules for the system 200. The label system interface 400 includes a label dialog 402, a label dialog logic component 403, an extended language interface 404, and a label interface 405.

The developer interacts with the label system interface 400 through the label dialog 402. Label dialog 402 is a user interface that allows the developer access to the features of the label system interface. In one embodiment, the label dialog 402 is a window that allows the user to view and manage the use of a specific label. The label dialog 402 uses this interface to the metadata store to handle labels, and to access the full set of commands available for the label in all of the available languages. In order to provide these features the label dialog interface 402 requires access to all of the available languages for each label in the label system 400.

However, the label dialog 402 does not contain any logic to determine if a label can be used in a specific situation. All controls are passed to a class controlling the label interface or label dialog logic component 403. The label dialog logic component 403 is designed to be used with the label dialog 402, but because it contains all of the logic for the label dialog 402 certain features of the label dialog logic can be reused in other areas. Further, the label dialog logic component 403 ensures that each label is used in a way that is consistent with the correct combination of namespace and category for the label. This logic prevents the inadvertent use of a label in a different area without first creating a new master label.

The extended language interface 404 provides the label dialog interface 400 access to all of the languages available in the system. Extended language interface 404 uses another class to make multiple languages available to the label dialog logic component 403 and label dialog 402. The extended language interface 404 has only methods that are common to more than one language in the system (returning a list of all available languages, and also returning the ID for the current language). Methods that are only relevant to one language are located directly on the label class 405. The label class makes it possible to connect to the labels in the metadata. There is one instance of the label class in each available language However, in some cases there may be no instance for a particular class.

The language interface component 404 also controls access to the available languages. The language interface component 404 contains a map of instances of the label. Also in the language interface component 404 is an interface to the each of the available extra language class for the present label.

Figure 5:
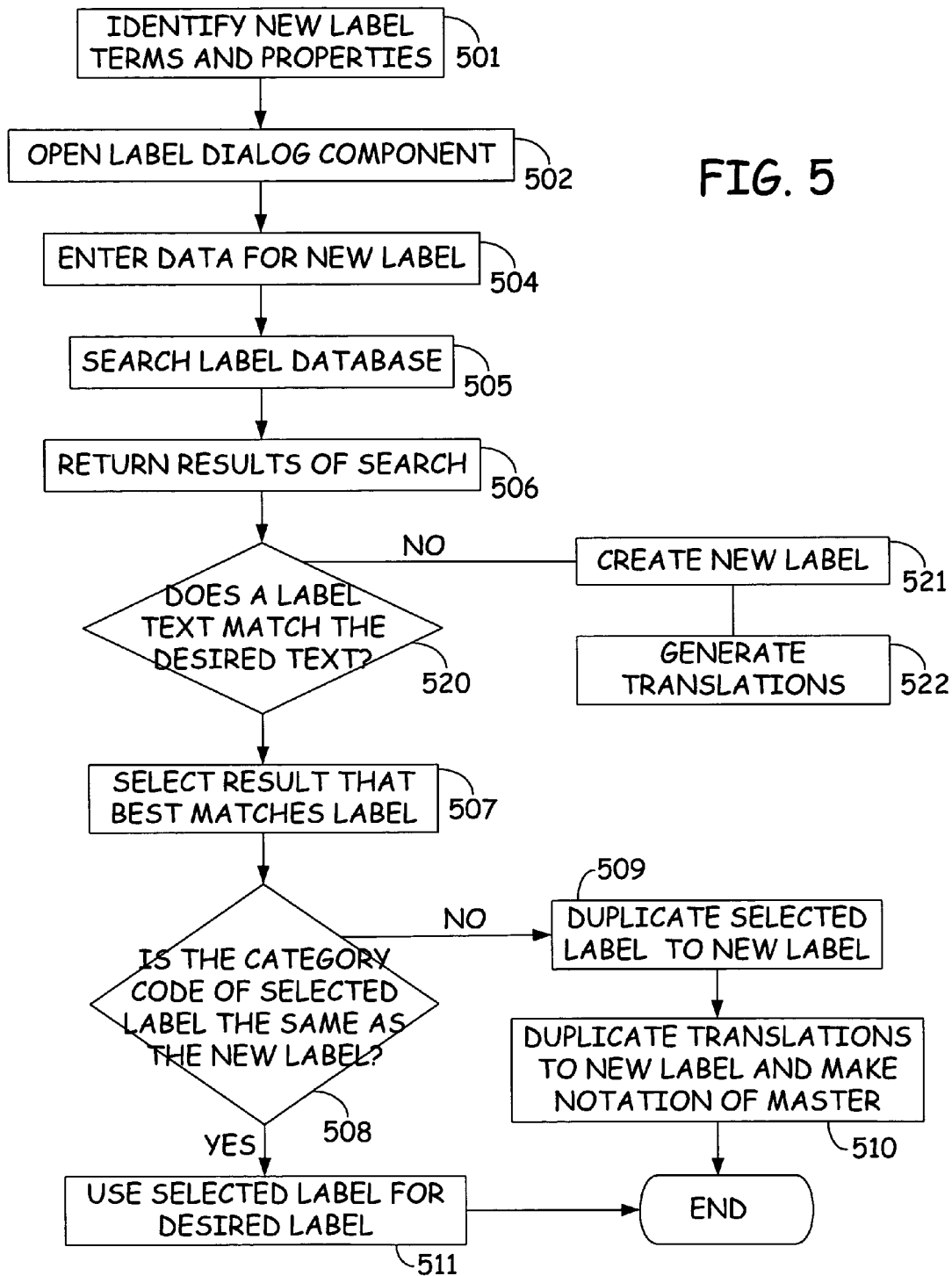
FIG. 5 is a flow diagram illustrating the steps executed when a new label is created.

FIG. 5 is a flow chart illustrating the steps performed when a developer creates a new label for a module during the development of a portion of the module according to one embodiment of the present invention. For example, if the developer desires to make a label representing an input for a "customer" in a module. The developer must decide how the label will be used in the module. The term "customer" has many different meanings. For example, customer may mean one who buys goods and services from you, or it can mean one "who" you deal. The use of this word will have an impact on the text in other languages. This is illustrated at block 501 of FIG. 5.

Next the developer opens the label dialog program. The label dialogue that is opened is illustratively similar to the label dialog 600 illustrated in FIG. 6. However, other interfaces can be used. The interface that is presented allows the developer to enter in the specific text that they desire for the label. The opening of the label dialog is illustrated at block 502 of FIG. 5.

Once the label dialog has been opened, the developer then enters in the desired text for the label at line 602. Alternatively, the developer can enter at line 602 a portion of the desired text for the label. For example, the developer can enter in the text section "customer" or can enter "cust". Further, the developer enters data into the interface indicating how the new label is to be used at lines 603 and 604. This data can be used for searching for existing labels in the label system or can be used when creating a new label. For example, if the developer is creating a module for that manages sales, and wants to generate a label for a purchaser using the term "customer", then the developer would enter in the category code for a purchaser at line 604. This code can be entered manually, by a pull down menu, or automatically by using the current system settings. This category code controls the rest of the process used by the function. Generally, the category code and the namespace entries in the label dialog conform to the current settings of the label system. The entry of data is illustrated at block 504 of FIG. 5. This data is entered in as a regular expression. Further, in alternative embodiments the developer can control the search, by selecting a check box limiting the search to selected categories.

The developer activates a search function by selecting button 650. However other techniques can be used to activate the label search function. The activation of the search engine is illustrated at block 505 of FIG. 5.

The present invention then searches though the database to find entries in the database matching the entered text. During the search process a progress indicator may be displayed to the user. One progress indicator is illustrated by reference number 640 in FIG. 6. When the search is complete the progress indication disappears, and the dialogue returns to the developer a display of all of the labels that matched the initial query in the selected language. This is illustrated at block 506.

Figure 6:
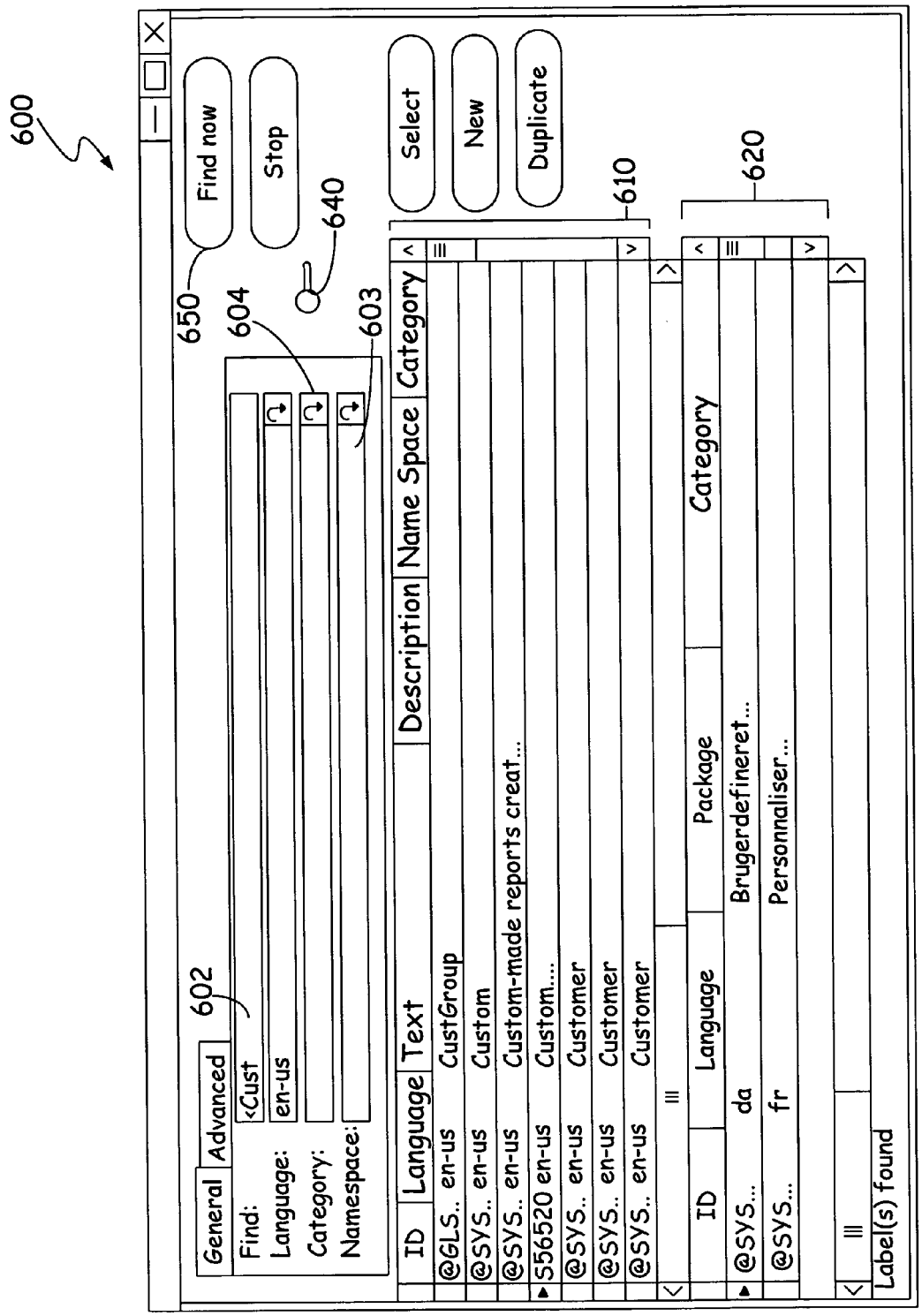
FIG. 6 is an example of a user interface invoked by the user when developing and searching the label database.

The interface 600, in one embodiment, enlarges to display the identified matches as illustrated in FIG. 6. In this embodiments the list of matches displayed can include information that is contained in the label ID table 230, as well as some of the information from the label text table 240. The result view displays texts in the selected language combined with extra information available through the relation to the table 230. The results of the search are presented to the developer in ascending order by GUID. An example of results are displayed in area 610 of FIG. 6. However, other ordering techniques can be used such as ascending order by text matching. The developer then checks to see if any of the label texts match the desired text. This is illustrated at block 520. If a text matching the desired text for the new label is found, the developer then highlights, or otherwise indicates, the specific label that matches the desired label text. This is illustrated at block 507. Translations of the label may also be shown at 620, if desired.

Next the system checks to see if the selected label category and namespace are the same as the category of the new label. This is illustrated at block 508. If the label category and namespace are the same between the selected label and the new label, the information of the selected label is used for the new label. This is illustrated at block 509 of FIG. 5.

If the namespace and category of the label is not the same as the desired use for the new label, the label must be duplicated. This duplicated information also includes all the translated versions of the selected label. When the label is duplicated to the new label, an entry is made in the label ID table 230 for the new label indicating the GUID of the label from which it was duplicated. This is illustrated at block 510. This makes it possible to update easily the text of the new label when the master label text is changed. This update on change can be made by executing a typical find and replace protocol or through any other automated method.

If the no matches were found during the search the developer must generate a new object for the new label. The generation of the new object is illustrated at block 521. During the generation of the label, the specific characteristics of the label are stored in the label ID table 230 and the label text table 240. If the text of the label is not complete the developer enters in the remainder of the desired text in the label dialog 600. The namespace and category codes are entered based upon the current settings of the label system. The developer must also generate translations for the label text in any desired languages. Also, the ID for the current operating language for the label are stored as the master language. The addition or generation of these translations and entry of label properties is illustrated at block 522.

In conclusion the present invention is directed to a new method of storing and using labels in a business solution software program. Instead of having a single resource file for each language, the information is instead split up into a 1::n relationship. The '1' side of the relation keeps the label identifier and other practical general label information. The 'n' side of the relation keeps the label text on the specific language. Arranging labels in this manner makes it possible to access labels on all languages at runtime.

During development of a new label, the label can be duplicated using an existing label in the system or by creating a new label from scratch. When searching for labels, it's possible to enter a expression (e.g. '<Ledger' gives all available labels starting with Ledger. However, depending on where the system is implemented different syntax can be used.). It's possible to reduce the hits by selecting a specific namespace or category to be search. The search could also be performed by using a term database. A new label can also be created by using the term database (web-service). When entering the term database, it's possible to combine a current search criteria with extra criteria's describing the actual situation in which the label is to be used. This to ensure that the right term is used. When a label is found in the term database it is duplicated to a new identifier. The term database has translations for all supported languages. When a label is to be used, it has to be present in the search result, matching the actual namespace and category. If this is the case it's possible to select the specific label. If this isn't the case, a new label is created by writing the label text by hand, or by duplicating the label from another namespace/category of term database. Duplicating a label gives a new identifier related to the current namespace and category. All texts and other general information is duplicated.

The management of labels is done by using a label dialog, which is called directly from the specific label property. The dialog makes it possible to maintain labels, and to select a specific label for use on the specific property. Using the label system through code happens through a Label interface giving the needed features. This makes it possible to change the way labels are stored. The storage could be a SQL metadata store, resource files or web services. In fact it could be a combination of all types of storage depending on the specific access to the web.

The Label dialog ensures that labels are used in the right situation. Introducing categories to the label system ensures that labels are used correctly. But the feature has also another purpose. When translating labels, it's possible to see where labels are to be used through a combination of the namespace information and category. This makes it possible to find the correct term to be used. Knowing where labels are used makes it possible to add more Best Practices checks to the Best Practices framework. The present invention allows the generation of specific translation files fitting known (or unknown) translation tools. By exporting date information to the translation files, it's possible to check the dates when importing the translations. This is to secure that the ongoing translation process is up to date with the last changes in the system. With an updated cross reference system, it is possible to see where a specific label is used. It's also possible to see changes to a specific label. This feature is relevant for translators giving them the possibility to determine if changes to a specific label is simple (e.g. added a '.' At the end of the line).

Although the present invention has been described with reference to particular embodiments, workers skilled in the art will recognize that changes may be made in form and detail without departing from the spirit and scope of the invention.

What is claimed is:

1. A computer-implemented method of creating a new label in a computer-implemented business integration system, wherein the new label is a computer-implemented user interface element configured to identify a control within a user interface associated with the business integration system, the method comprising:

receiving data at an interface indicating a desired text for the new label;

searching a label database for indications of existing labels that include text matching the desired text, wherein existing labels represented in the label database are computer-implemented user interface elements; and returning to a user, based at least in part on the results of the search of the label database, a list of existing labels that include text matching the desired text.

2. The method of claim 1 further comprising:
creating a new entry in the label database for the new label.

3. The method of claim 2 wherein creating a the new entry comprises:

assigning a GUID for the new label; and creating a record in a label text database for text associated with the new label.

4. The method of claim 3 further comprising:
receiving data at the interface indicating a category code for the new label; and
receiving data at the interface indicating a description for the new label.

5. The method of claim 4 wherein receiving data at the interface indicating a description includes receiving a namespace.

6. The method of claim 4 further comprising:
receiving data at the interface indicating an original language for the new label.

7. The method of claim 2 further comprising:
storing the new label in the label database.

8. The method of claim 1 further comprising:
receiving data at the interface indicating how the new label is to be used.

9. The method of claim 8 wherein searching the label database for existing labels that include text matching the desired text comprises:
  selecting records in the label database having at least a portion of the desired text;
  identifying in the selected records an indication of how the selected record is used;
  comparing the indicated use of the selected records with the indicated use of the new label; and
  ordering the selected records based on a the degree of match relative to the desired text and indicated use of the new label.

10. The method of claim 9 wherein returning to the user the list of existing labels comprises:
  displaying the list of existing labels.

11. The method of claim 10 wherein displaying the list comprises:
  displaying the list of existing labels where the existing labels having a closest match to the desired text are displayed first.

12. The method of claim 9 further comprising:
  receiving a selection of a label from the list of existing labels; and
  comparing the indicated use of the selected label against the indicated use of the new label.

13. The method of claim 12 comprising:
  determining that the indicated use of the selected label is not the same as the indicated use of the new label; and
  duplicating the selected label to the new label in the label database.

14. The method of claim 13 further comprising:
  duplicating to the record in the label text database for the new label any translations in the label text database for the selected label.

15. The method of claim 13 further comprising:
  associating an ID of the selected label with the new label.

16. The method of claim 12 comprising:
  determining that the indicated use of the selected label is the same as the indicated use of the new label; and
  using the selected label for the new label.

17. A computer-implemented method of creating a new label in a computer-implemented business integration system, wherein the new label is a computer-implemented user interface element configured to identify a control within a user interface associated with the business integration system, the method comprising:
  receiving data at an interface indicating how the new label is to be used;
  searching a label database for indications of existing labels, wherein searching comprises searching based at least in part on the data indicating how the new label is to be used, and wherein the existing labels represented in the label database are computer-implemented user interface elements configured to identify a control within the business solution software system; and
  returning to a user, based at least in part on the results of the search of the label database, a list of existing labels.

* * * * *